United States Patent [19]
Hadidi et al.

[11] Patent Number: 4,884,247
[45] Date of Patent: Nov. 28, 1989

[54] METHOD OF PROCESSING GEOPHYSICAL DATA TO COMPENSATE FOR EARTH FILTER ATTENUATION

[75] Inventors: Mohamed T. Hadidi, Dallas, Tex.; Andrejs Jurkevics, Arlington, Va.; Andrew F. Linville, Jr., Dallas, Tex.

[73] Assignee: Mobil Oil Company, New York, N.Y.

[21] Appl. No.: 107,717

[22] Filed: Oct. 13, 1987

Related U.S. Application Data

[63] Continuation-in-part of Ser. No. 23,313, Mar. 9, 1987, Pat. No. 4,780,859.

[51] Int. Cl.$^4$ ............................................. G01V 1/36
[52] U.S. Cl. ...................................... 367/43; 367/47; 364/421
[58] Field of Search ..................... 367/46, 45, 43, 47, 367/38, 63; 364/421, 422, 726; 73/602

[56] References Cited

U.S. PATENT DOCUMENTS

| | | | |
|---|---|---|---|
| 3,396,365 | 8/1968 | Kerns . | |
| 3,581,274 | 5/1971 | Ruehle | 367/43 X |
| 3,634,668 | 1/1972 | Shaffer | 364/726 |
| 3,662,108 | 5/1972 | Flanagan | 367/43 |
| 4,052,889 | 10/1977 | Mucciardi et al. | 73/67.8 S |
| 4,164,021 | 8/1979 | Nishitani et al. | 364/726 |
| 4,209,672 | 6/1980 | Nitta et al. . | |
| 4,213,183 | 7/1980 | Barron et al. | 364/507 |
| 4,310,721 | 1/1982 | Manley et al. . | |
| 4,545,039 | 10/1985 | Savit | 367/39 |
| 4,545,250 | 10/1985 | Miwa | 73/602 |
| 4,608,673 | 8/1986 | Lazear | 367/43 |
| 4,655,228 | 4/1987 | Shimura et al. | 128/660 |
| 4,780,859 | 10/1988 | Hadidi et al. | 367/43 |

OTHER PUBLICATIONS

Aki and Richards, Quantitative Seismology Theory and Methods, vol. 1, 1980, pp. 167–185.
Godfrey et al., "A Comparison between Spiking and Signature Deconvolution", Society of Exploration Geophysics, Atlanta, GA (1984), pp. 608–611.
Hale, "An Inverse-Q Filter", Stanford Exploration Project, Report 26, 1981, pp. 231–243.
Hale, "Application of Inverse-Q Filtering", Stanford Exploration Project, Report 26, 1981, pp. 245–259.
Hale, "Q-Adaptive Deconvolution", Stanford Exploration Project, Report 30, 1982, pp. 133–158.
Kjartansson, "Attenuation of Seismic Waves in Rocks and Applications in Energy Exploration" (1979).
Potts et al., "Pre-Stack Wavelet Deconvolution", Society of Exploration Geophysicists, Dallas, Texas (1982).
Sherwood et al., "Minimum Phase and Related Properties of the Response of Horizontally Stratified Absorptive Earth to Plant Acoustic Waves", Geophysics, vol. 30, pp. 191–197, 1965.
Bickel et al., "Plane-Wave Q Deconvolution", *Geophysics,* vol. 50, No. 9, pp. 1426–1439, 1985.

Primary Examiner—Thomas H. Tarcza
Assistant Examiner—Tod Swann
Attorney, Agent, or Firm—Alexander J. McKillop; Charles J. Speciale; George W. Hager, Jr.

[57] ABSTRACT

Method to process seismic data to yield useful information regarding the subsurface area explored. Generated seismic energy travels into a subsurface formation where it is distorted and attenuated. The distorted and attenuated seismic pulse is detected by a geophone or other seismic receiver and recorded. The received seismic traces are first compensated for the attenuation effects of the earth filter and the compensated seismic traces are then used to produce a close approximation of a zero-phase, band-limited output wavelet of the reflectivity of the geophysical formation under exploration.

37 Claims, 6 Drawing Sheets

METHOD OF PROCESSING GEOPHYSICAL DATA TO COMPENSATE FOR EARTH FILTER ATTENUATION

RELATED APPLICATIONS

This application is a Continuation-in-Part of U.S. patent application Ser. No. 023,313, filed Mar. 9, 1987, now U.S. Pat. No. 4,780,859.

BACKGROUND OF THE INVENTION

1. Field of the Invention

This invention relates to the processing of geophysical data to render it more useful in interpreting the geophysical characteristics of the earth in the exploration for oil and gas deposits. More specifically, this invention relates to a method for compensating for the effects of earth filtering on seismic data so that later processing of the seismic data may be performed on a more accurate representation of the reflectivity characteristics of the subsurface formation. It should be clearly understood, however, that while the invention will be described with respect to the processing of seismic data, it is equally applicable to other types of geophysical data, such as well logs, gravity information, and magnetic data.

2. Description of the Prior Art

In seismic exploration, data is obtained by first creating an artificial disturbance along the earth by use of dynamite or the like. The resulting acoustic waves travel downwardly in the earth and are reflected upward from subsurface reflecting interfaces. The reflected waves are received at detectors or geophones located along the ground and recorded in reproducible form. Ideally, the waves recorded at the detectors would be exactly representative of the reflection characteristics (referred to as the reflectivity function) of the earth without the presence of any undesirable components, such as noise or distortion.

Unfortunately, the signals recorded at the detectors contain many undesirable components which often obscure the reflectivity function of the earth and prevent the finding of an area of the earth where oil and gas deposits may be present. One undesirable component of the recorded seismic data is due to the seismic disturbance created by the explosion of dynamite and known as the shot pulse. Ideally, the time waveform of the shot pulse should be a simple short pulse, such as an impulse or square wave. Instead, the shot pulse resulting from the explosion of dynamite or almost any other known seismic source, is a complex train of wavelets. As a result, the reflectivity function of the earth is obscured by the complex waveforms of the reflected shot pulse appearing on the recorded data.

Other undesirable components in the seismogram may be referred to collectively as the distortion operator. These include the effect of multiple reflections, ghosts, reverberations, and other types of distortion known in the seismic art. Furthermore, the effect of the distortion operator is intermixed in a complex way with the shot pulse. Therefore, the distortion operator and the shot pulse may be lumped together as a single component and called the distorted shot pulse, or seismic wavelet. It is desirable to remove the effects of the distorted shot pulse on the seismogram, but the difficulty is that the waveform of the distorted shot pulse is unknown.

Also affecting the propagation of seismic waves from the source to the receiver are several other phenomena which causes additional distortion of the received waves. One such phenomenon is absorption. Absorption causes the actual loss of seismic energy by converting it to other forms of energy. This type of loss of seismic energy is generally known as intrinsic attenuation. A second phenomenon is intrabed multiple interference. Intrabed multiple interference redistributes seismic energy between downward and upward directions. This type of loss of seismic energy is generally known as apparent attenuation. Apparent attenuation causes a progressive loss of the higher frequencies (broadening of the seismic wavelet) and an increasing phase distortion with increasing travel time for the seismic wavelet received.

It is this combination of intrinsic and apparent attenuation which is known as the earth filter. As a result of earth filtering, the seismic wavelet is time varying. The existence of a time varying seismic wavelet violates a basic assumption of deconvolution theory and impairs the ability to use deconvolution to determine the earth filter characteristics as part of a method of seismic interpretation.

The traditional method of deconvolution, generally known as the "flat-iron" or the "Wiener-Levinson" deconvolution method, assumes that the seismic wavelet is minimum phase or "front-loaded." It is also assumed the reflectivity function is white (i.e. its amplitude spectrum is constant with frequency.) Under these assumptions, the amplitude spectrum of the wavelet and the amplitude spectrum of the seismic trace are equivalent. Further, once the amplitude spectrum is determined, the phase spectrum can be easily calculated by using the above-mentioned assumption that the wavelet is minimum phase after sampling. Once the seismic wavelet is estimated from the calculated amplitude spectrum and phase spectrum, an inverse filter can be designed to compress the seismic wavelet into a short output wavelet close to a spike. In the actual implementation of the Wiener-Levinson method, the inverse filter is calculated in one step from the autocorrelation of the seismic trace. Since the filter calculated in the Wiener-Levinson method is minimum phase, the output wavelet tends to be minimum phase, instead of zero phase.

A method of processing geophysical data which improved upon the above-described "flat-iron" or "Wiener-Levinson" method was disclosed in U.S. Pat. No. 3,396,365, issued to Clyde W. Kerns for a method of processing geophysical data with stable inverse filters. Kerns discloses a method of processing seismic data to suppress coherent noise such as multiples, reverberations and ghosts. In Kerns, an autocorrelation function is produced from an input seismic signal to characterize the noise. A white spike is added to the center point of the autocorrelation function to assure the stability of an inverse filter which is generated from the autocorrelation function. The input seismic signal is then convolved with the inverse filter to produce a filtered signal with the undesired components suppressed.

The Kerns patent also discloses what has been the traditional solution to the problem of intrinsic and apparent attenuation of the seismic wavelet due to the earth filter. In such traditional solutions, a portion of the input trace, generally referred to as a "window", over which the seismic trace does not vary with respect to time, was selected. Each window would be deconvolved separately. After separate deconvolution of each window, the deconvolved windows would be combined together to form a deconvolved seismic trace.

In contrast to the traditional window approach to compensate for earth filter attenuation, the method of compensating for earth filter attenuation which is the subject of the present invention avoids the prior art window approach by disclosing a method of applying a time varying filter to the seismic trace to produce a stationary trace and then apply traditional deconvolution theory to determine the seismic wavelet. By utilization of the disclosed method, the assumption that the input wavelet does not vary in time, an assumption inherent in the prior art "windowing" methods, would be avoided.

An alternate method of determining the effect of the earth filter on a seismic trace which avoids the time-domain "windowing" techniques of the prior art was disclosed in *Q-Adaptive Deconvolution* by D. Hale. Hale discloses two iterative procedures for implementing inverse Q-filtering. However, the procedures disclosed by Hale make several assumptions which cause Hale to arrive at an approximate dispersion relationship. Use of the approximate dispersion relationship, in turn, degrades the value of the Q compensation obtained by Hale.

The article entitled *Minimum Phase and Related Properties of the Response of a Horizontally Stratified Absorptive Earth to Plane Acoustic Waves* by J. Sherwood and A. Trorey has shown that both linear intrinsic attenuation and apparent attenuation are minimum-phase at least in the one dimensional case. Therefore, the phase distortion $\phi(f)$ due to the earth filter $QF(f)$ may be obtained as the Hilbert transform of the logarithm of the absolute value of the amplitude spectrum $|QF(f)|$. More specifically:

$$\phi(f) = H[\log|QF(f)|] \qquad (1)$$

$$\phi(f) \stackrel{\Delta}{=} -\frac{1}{\pi f} * \log|QF(f)| \qquad (2)$$

where:
* = the convolution operator.

The phase distortion $\phi(f)$ appears as dispersion, i.e. a change in phase velocity with frequency.

The publication *Quantitative Seismology Theory and Methods*, Vol. 1 by K. Aki and P. Richards discusses several models of the earth-filter response which provide for a constant or nearly constant Q over part of or the entire frequency range. More specifically, $$\frac{c}{c_o} = 1 + \frac{1}{\pi Q} \ln\left|\frac{f}{f_o}\right| \qquad (3)$$

where:
c and $c_o$ are the phase velocities at the arbitrary frequencies f and $f_o$ respectively.

One model is provided by the thesis entitled *Attenuation of Seismic Waves in Rocks and Applications in Energy Exploration* by Einar Kjartansson. According to Kjartansson's model, the phase velocity is given by $$\frac{c}{c_o} = \left|\frac{f}{f_o}\right|^\gamma \qquad (4)$$

where:

$$Q^{-1} \stackrel{\Delta}{=} \tan(\pi\gamma) \simeq \pi\gamma; \qquad (5a)$$

implying:

$$\gamma \simeq \frac{1}{\pi Q}. \qquad (5b)$$

This leads to the same dispersion relation as in equation (3).

SUMMARY OF THE INVENTION

It is a feature of this invention to provide a method for removing the effects of earth filtering (intrinsic and apparent attenuation) on seismic data generated during the exploration of a geophysical formation.

It is another feature of this invention to provide better phase compensation and produce a close approximation of a zero-phase, band-limited output wavelet of the reflectivity of the geophysical formation under exploration.

A seismic trace which represents seismic data generated during exploration of a subsurface formation is distorted while passing through the formation prior to recording. The recorded seismic trace is first compensated to better represent the reflectivity function of the geophysical formation unaffected by the attenuating effects of the earth filter. To compensate the recorded seismic trace, the symmetric and anti-symmetric components of the two sided operator $h_{GBL}$ are separately calculated and then combined to form $h_{GBL}$. The recorded seismic trace is then convolved with $h_{GBL}$ N times corresponding to a Taylor series expansion of the frequency domain inverse earth filter IQF(f). The selected trace and the N convolved traces are then summed to get the compensated seismic trace.

The compensated seismic trace is then manipulated to produce accurate estimations of the amplitude and phase spectra of the seismic wavelet. The estimations are then used to produce a two-sided, least squares filter that will shape the seismic wavelet into a zero-phase, low side lobe output wavelet. To estimate the amplitude and phase spectra of the seismic wavelet, the compensated seismic trace is used to produce an amplitude spectrum A(F) for each trace. The autocorrelation function $\phi(\tau)$ for each seismic trace is calculated and Fourier transformed to yield the square of the frequency domain amplitude spectrum. The amplitude spectrums A(F) are stacked and the average amplitude spectrum calculated so that the effects of nonwhite reflectivity are ameliorated. The estimated amplitude spectrum is then smoothed and the effects of reflectivity leakage reduced by cepstral windowing. The cepstral windowed amplitude spectrum is then amortized at low signal to noise ratios to approximate the analog wavelet. Amortization is also intended to prevent inaccuracies in the estimation of the phase spectrum for the seismic wavelet. Low-end amortization is performed using the characteristics of the low-cut field filter of the field recording system. High-end amortization is performed using the characteristics of the earth filter and the high-cut field filter of the field recording system. The amortized amplitude spectrum is cepstral windowed a second time to eliminate rapidly varying components and the resultant amplitude spectrum used to estimate the phase spectrum for the seismic wavelet. A two-sided, least squares filter is then calculated and applied to the compensated seismic traces to shape the seismic wavelet to a zero-phase, low side lobe output wavelet.

The above and other objects, advantages and features of the invention will be more readily understood from the following detailed description of the invention, which is provided in connection with the accompanying drawings.

BRIEF DESCRIPTION OF THE DRAWINGS

FIGS. 5a–c illustrate waveforms used in describing the process illustrated in FIG. 4. Specifically.

DESCRIPTION OF THE PREFERRED EMBODIMENT

1. Theory

The earth-filter response, which is time-varying due to its dependence on the two-way travel time, may be expressed in the frequency domain as:

$$QF(f) = e^{-\hat{H}(f)} \tag{6}$$

where:

$$\hat{H}(f) = \pi \frac{|f|}{Q} \frac{x}{c} + i2\pi f\left(\frac{x}{c} - \tau\right) \tag{7}$$

$$\tau \stackrel{\Delta}{=} x/c_o$$

In equations (7) and (8a), we use the usual definitions of the quality factor, Q, and the phase velocity, c(f), namely $$|QF(f)| = \exp\left(-\frac{\pi |f|}{cQ} x\right) \tag{9}$$

$$\phi_x(f) = wt - kx = 2\pi f\left(t - \frac{x}{c(f)}\right) \tag{10}$$

The time-varying, frequency domain earth filter response may be written as:

$$QF_\tau(f) = e^{-(\tau/Q)H(f)} \tag{11}$$

The inverse filter in the frequency domain would then be simply exp $$\left(+\frac{\tau}{Q} H(f)\right).$$

Band-limiting before sampling and gain-limiting to avoid excessive amplification of high frequency noise would yield the following expression for the inverse earth filter $IQF_\tau(f)$:

$$IQF_\tau(f) = \begin{cases} e^{\frac{\tau}{Q} HGL(f)}, & |f| < f_N; \\ 0, & \text{outside.} \end{cases} \tag{12}$$

$$= \sum_{n=0}^{\infty} \frac{1}{n!} \left(\frac{\tau}{Q}\right)^n H^n_{GBL}(f).$$

where:
 GL = gain limited; and where:
 GL = gain limited; and
 GBL = gain and band limited.

The inverse time domain earth filter may then be obtained by expanding Equation (12) according to the Taylor series expansion of the exponential function followed by taking the inverse Fourier transform of the Taylor series expansion to yield:

$$IQF_\tau(t) = \frac{1}{\Delta t} \text{sinc}(t/\Delta t) + \frac{\tau}{Q} h_{GBL}(t) + \tag{13}$$

$$\frac{1}{2}\left(\frac{\tau}{Q}\right)^2 (h_{GBL} * h_{GBL}) + \ldots,$$

where:

$$\text{sinc}(x) \stackrel{\Delta}{=} \frac{\sin \pi x}{\pi x}. \tag{14}$$

Compensation for the effects of the earth filter according to the above described method will correctly compensate for the phase distortion of the earth filter which is assumed to be minimum phase in the analog sense rather than in the sampled or digital sense as assumed in current art methods. This same method may be used to correct for other dispersion relations other than those assumed by a constant Q.

2. Operation

Figure 1:
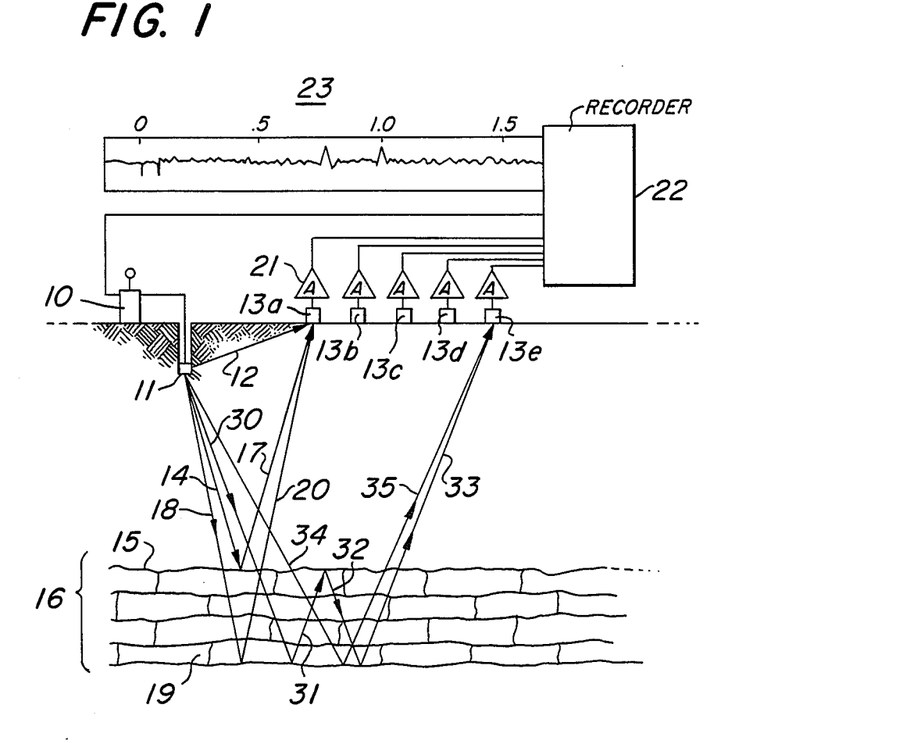
FIG. 1 illustrates a seismic exploration system for acquiring seismic data.

Referring first to FIG. 1, a conventional seismograph system used for the exploration of subsurface formations is shown. Exploration commences upon the actuation of blaster 10 which actuates a generator of acoustic energy such as a small charge of an explosive, such as dynamite at the shot point 11. The charge of explosive produces an acoustic pulse which travels through subsurface formation 16. While other forms of seismic wave generators may be utilized, the detonation of an explosive is a wave generator of conventional type. The wave generator initiates the travel of seismic waves from the shot point 11 downwardly through the earth strata and also by way of a more or less direct path 12 to the first detector geophone 13a. The downwardly traveling waves, as along paths 14, 18, 30, and 34, are reflected from the surfaces 15, 19 of a relatively thick high velocity bed 16. The reflected waves travel along, for example, along paths 17, 20, 31, 32, 33 and 35 to the detector 13a–e. Electrical signals generated by the detectors 13a–e are applied to an amplifier 21 including the usual adjustable filters, and its output, in turn, is applied to a recorder 22.

Figure 2:
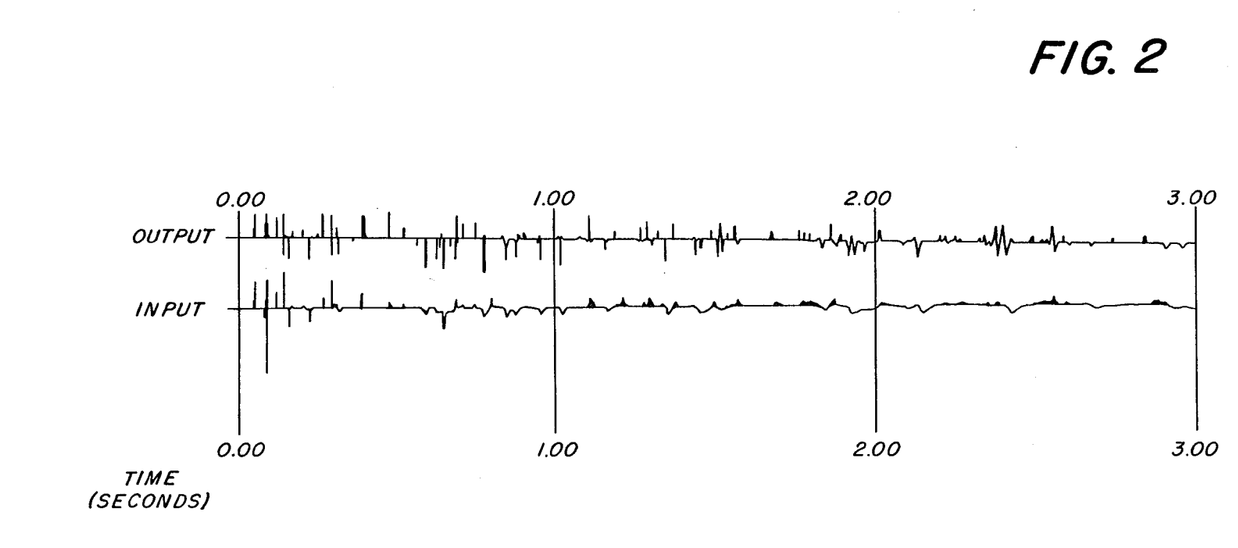
FIG. 2 illustrates a typical seismic trace derived from seismic exploration of a geophysical formation utilizing the seismic exploration system of FIG. 1 and the same seismic trace after compensating for the effects of the earth filter.

A series or group of seismic traces similar to the seismic trace illustrated in FIG. 2, which may either be acquired by the standard seismic exploration techniques described above or other seismic exploration techniques may be used to yield valuable information regarding the geophysical characteristics of the explored subsurface region by the manipulation of such seismic data in accordance with the methods herein described.

The method for compensating a series of seismic signals for the effects of the earth filter is now described with reference to FIG. 3. A series of seismic signals or traces uncompensated for the effects of the earth filter such as the seismic trace illustrated in FIG. 2 and acquired by the conventional seismic exploration apparatus illustrated in FIG. 1 is inputted as a data set into a digital computer of conventional design at step 10 for processing. A first seismic trace is selected at step 20. Proceeding to step 30, if the selected seismic trace is determined to be the first seismic trace from the data set to be analyzed, a calculation of $h_{GBL}$ to be used on all seismic traces will commence at step 40. Otherwise, the method of analysis will proceed to step 70.

Returning to step 40, a calculation of $h_{GBL}$ for the first seismic trace selected will commence by the calculation of the antisymmetric component of $h_{GBL}$. As previously discussed, the antisymmetric component of $h_{GBL}$ compensates for the dispersion of the seismic traces due to the earth filter. Recalling equations (7) and (8a), H(f) may be simplified to the following expression:

$$H(f) = \pi |f| + i2f \ln|f_o/f| \quad (15)$$

and the symmetric and antisymmetric components of $h_{GBL}$ may be found by separating H(f) into its real and imaginary parts followed by transforming the respective real and imaginary parts into the time domain to determine the symmetric and antisymmetric components of $h_{GBL}$. In equation form:

$$H(f)_{real} = \pi |f| \quad (16)$$

$$h_{GBL(symmetric)} = h_s(t) = \mathcal{F}^{-1}[\pi|f|] \quad (17) \text{ and:}$$

$$H(f)_{imaginary} = i2 f \ln |f_o/f| \quad (18)$$

$$h_{GBL(anti-symmetric)} = h_{as}(t) = \mathcal{F}^{-1}[2 f \ln|f_o/f|]tm \quad (19)$$

As previously discussed, the symmetric component of $h_{GBL}$ compensates for the attenuation of the seismic traces due to the earth filter.

Proceeding to step 60, $h_{GBL}$ is determined by combining the antisymmetric component of $h_{GBL}$ determined at step 40 and the symmetric component of $h_{GBL}$ determined at step 50. The inverse time domain earth filter IQF (t), which was expressed in Equation (13) in terms of n-fold convolutions of the 2-sided operator $h_{GBL}$ as:

$$IQF_T(t) = \frac{1}{\Delta t}\text{sinc}(t/\Delta t) + \frac{\tau}{Q} h_{GBL}(t) + \frac{1}{2}\left(\frac{\tau}{Q}\right)^2 (h_{GBL} * h_{GBL}) + \ldots, \quad (13)$$

is now applied at step 70 by convolving the selected trace and $h_{GBL}$ determined by step 60 n times. A seismic trace compensated for the earth filter is then determined at step 80 by adding the selected trace and N convolved traces with appropriate time varying coefficients to calculate a trace compensated for the effects of the earth filter.

Proceeding to step 90, if it is determined that there are additional seismic traces to be compensated for the effects of the earth filter, the algorithm returns to step 20 for selection of the next seismic trace for compensation. If it is determined at step 90 that all seismic traces have been compensated for the effects of the earth filter, then the compensated seismic traces are deconvolved at step 95. Deconvolution, as previously described, is a method to manipulate seismic data contained in the traces to yield useful information regarding the geophysical characteristics of the subsurface formation. Generally speaking, deconvolution of the compensated traces is desirable in order to compress and stabilize the seismic wavelets and permit analysis of the resulting seismic traces. For example, the well-known "spike" deconvolution procedure (see, for example, U.S. Pat. No. 3,275,980 issued to Foster) or the equally well known "flat-iron" deconvolution procedure (see, for example, U.S. Pat. No. 3,396,365 issued to Kerns) would prove satisfactory in processing the compensated seismic traces. It is further contemplated that there are numerous other deconvolution methods which would successfully accomplish the desired result upon application to the compensated seismic traces. After deconvolution at step 95 according to any one of the numerous acceptable methods, the algorithm ends.

While it is specifically contemplated that numerous deconvolution methods would provide satisfactory results, the deconvolution method to be described below is considered to be the preferred method for use. As previously discussed, having compensated the received seismic energy for the effects of the earth filter, it is often desired that the compensated seismic data is next manipulated in accordance with the methods disclosed below to yield useful information regarding the geophysical characteristics of the subsurface formation.

The conventional model of seismic data provides that:

$$x(t) = r(t) * b(t) \quad (20)$$

where:

x(t) is the seismic trace;
r(t) is the earth reflectivity function; and
b(t) is the seismic wavelet.

Figure 3:
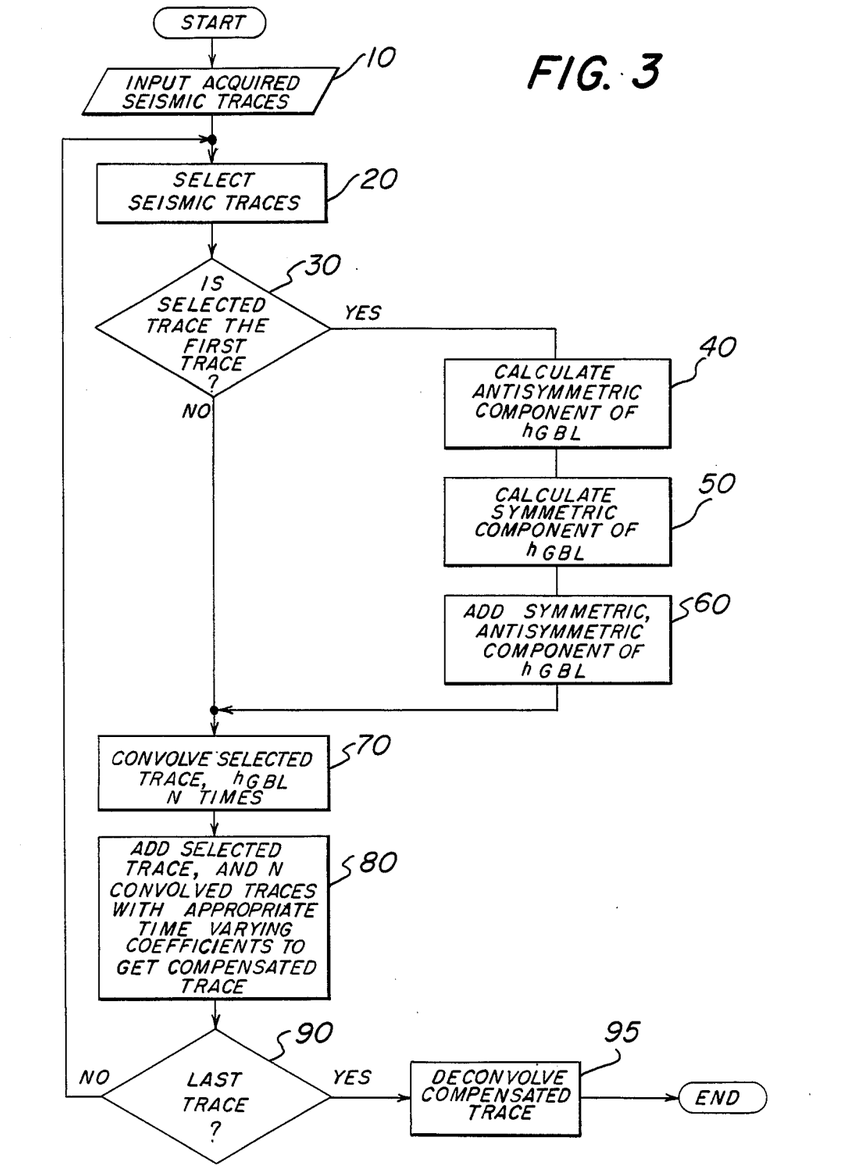
FIG. 3 is a flowchart of the method of compensating acquired seismic data for the effects of the earth filter.
Figure 4A:
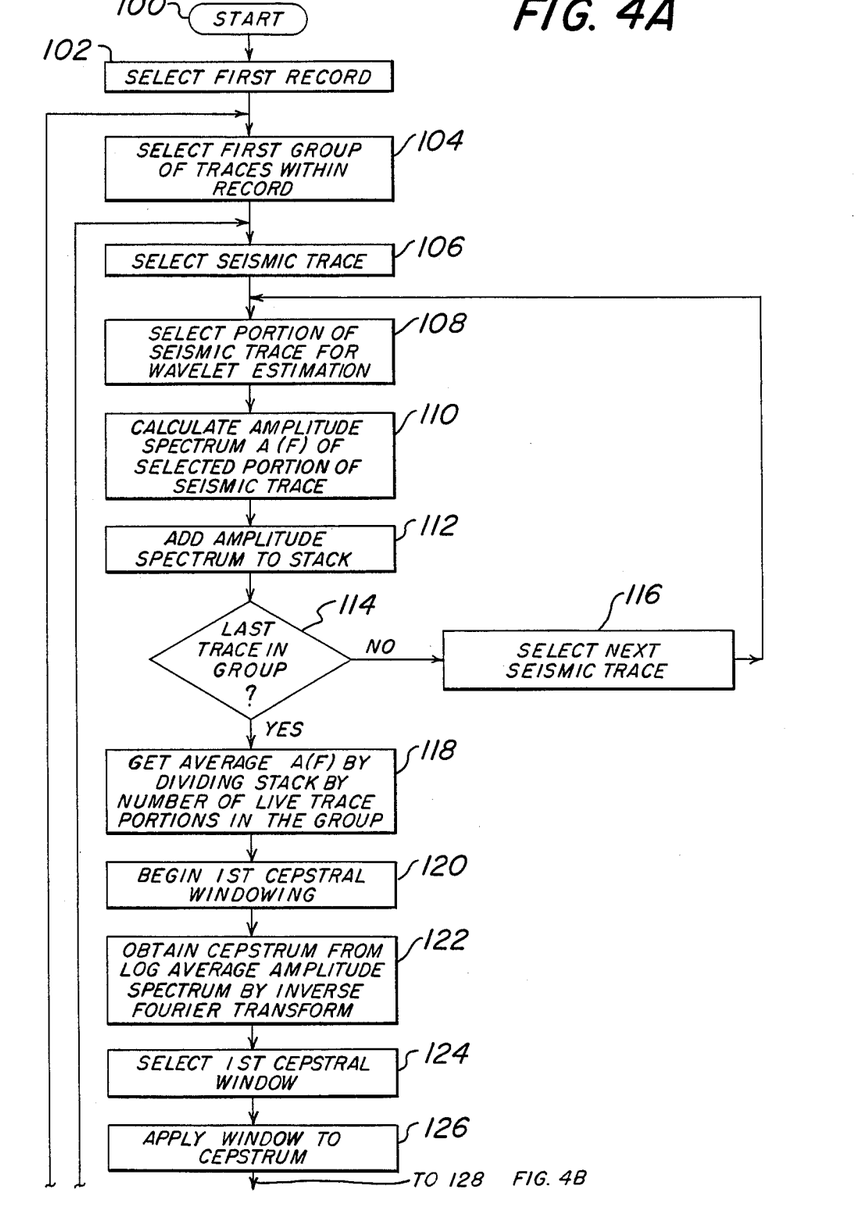
FIGS. 4a–b are a flowchart of the method of interpreting seismic data by manipulating acquired seismic data compensated for the effects of the earth filter according to the method of FIG. 3 to produce seismic traces with an optimum output wavelet to aid in interpretation of the geophysical formation being explored.

The method of interpreting seismic data commences at step 100 of FIG. 4a by inputting the compensated seismic traces determined according to the method of FIG. 3. Typically the seismic data acquired by the seismic exploration system of FIG. 1 and compensated according to the method of FIG. 3 would consist of any number of seismic records, each seismic record including at least one group of seismic traces, each group recorded in response to a single generation of seismic energy at the shot pulse location 11. Each seismic trace would be similar to the seismic trace of FIG. 2 shown here, by way of example, as compensated for the effects of the earth filter according to the method of FIG. 3.

A first compensated seismic record consisting of a number of groups of compensated seismic data is selected at 102. A group of compensated seismic traces which corresponds to seismic data recorded at a plurality of detectors in response to generation of seismic energy at a single location and compensated for the effects of the earth filter is selected at step 104. A first compensated seismic trace corresponding to data recorded at one of plural detectors is then selected at 106. The portion of the compensated seismic trace for which interpretation is desired is selected at 108. The selected portion would typically be noted by a seismic event of interest. Such selected data may comprise either the entire compensated seismic trace or a portion of it. The amplitude spectrum A(f) of the selected compensated seismic trace x(t) is then calculated at 110. The amplitude spectrum A(f) is calculated at 110 by manipulating the autocorrelation function $\phi(\tau)$ of the seismic trace x(t). For a compensated seismic trace c(t), the autocorrelation function $\phi(\tau)$ may be defined as the limit as T approaches infinity of ½ T times the integral from $-T$ to T of x(t)x(t+$\tau$)dt where $\tau$ is a time delay parameter.

The square of the frequency domain amplitude spectrum A(f) for the compensated seismic trace x(t) is then calculated by taking the Fourier transform of the autocorrelation function $\phi(\tau)$ for the seismic traces x(t). Such step of calculating the frequency domain amplitude spectrum may be alternately represented by reference to the following relationship:

$$[A(f)]^2 = \mathcal{F}[\phi(\tau)] \quad (21)$$

Further, while the square of the frequency domain amplitude spectrum for the power spectrum is suitable for the analysis techniques to be described herein, it should be noted that the unsquared frequency domain amplitude spectrum or the dB amplitude spectrum (also known as the log power spectrum) are also suitable alternatives for the described analysis techniques. In the specific analysis techniques to follow, the amplitude spectrum A(f) is utilized.

As discussed previously, one basic assumption in the prior art methods was that the amplitude spectrum of the reflectivity function is white. Such an assumption has been shown not only to be incorrect but also that such an assumption adversely affects the accuracy of the results of processing methods which make the assumption that the reflectivity is white. To ameliorate the effect of nonwhite reflectivity, the amplitude spectrum A(f) of the several seismic data traces x(t) are averaged. Such averaging (or stacking) of seismic trace amplitude spectrums is designed to make use of differential moveout to whiten the effective reflectivity. As the trace offset increases, events move closer in time. This moveout compression is not uniform, but its effect in the frequency domain can be inferred by considering the case of uniform compression. Uniform compression is a scaling of the time axis which results in an inverse scaling (stretch) of the frequency axis as follows:

$$y(t) = x(at) \implies Y(f) = \frac{1}{|a|} \times \left(\frac{f}{a}\right). \quad (22)$$

For this reason, any spectral valleys in the reflectivity spectrum will tend to average out resulting in the average spectrum being flatter (more white) than the individual spectra.

Therefore, stacking of the amplitude spectrums A(F) begins at 112 with the adding of the first amplitude spectrum A(F) of compensated seismic trace c(t) to the stack, the stack being defined as the sum of all amplitude spectrums. If it is determined at 114 that all trace amplitude spectrums A(F) have been placed in the stack, then the algorithm will continue at 118. If it is determined at 114 that there are additional compensated seismic traces which have not been analyzed, the next compensated seismic trace will be selected at 116 and the algorithm will return to step 108. Once all compensated seismic traces (or selected portions thereof) have had their respective amplitude spectrum A(F) calculated and added to the stack, the algorithm will proceed to 118 where the average amplitude spectrum A(F) of the stacked spectrums will be calculated by dividing the stack by the number of compensated seismic traces (or portions thereof) in the group.

A smoothing process of the average amplitude spectrum A(F) known as cepstral windowing then commences at 120. Cepstral windowing will reduce the effects of reflectivity leakage in the amplitude spectrum. To accomplish this, the stack is transformed from the frequency domain to the quefrency domain at 122. Such transformation may be accomplished by taking the inverse Fourier transform of the logarithm of the amplitude spectrum. Such transformation may be alternatively represented by reference to the following relationship:

$$\mathcal{F}^{-1}[\log|A(f)|] = \hat{a}(t) \quad (23)$$

A first cepstral window length is then selected at 124. While the selected window length will vary with the characteristics of the particular function being windowed, we have found that a cepstral window of 300 msec will yield satisfactory results for the typical function windowed as part of the present invention. The time domain function is cepstral windowed at 126 using the selected cepstral window length, followed by the forward Fourier transformation of the windowed quefrency domain function back to the frequency domain at 128 to yield the smoothed log amplitude spectrum.

By performing the above described steps, a good estimate of the amplitude spectrum of the seismic wavelet in the useful seismic band will be determined. In order to accomplish the previously discussed goals of this invention, an accurate estimation of the seismic wavelet in the low signal-to-noise regions (typically, the low and high frequency ends of the amplitude spectrum) is also necessary. Such estimation steps, which are to be described in the immediately following passage, are necessary because the phase spectrum is proportional to the Hilbert transform of the dB spectrum, and not the amplitude spectrum itself. Thus, low amplitude spectrum values can still have an important effect on the phase. Therefore, some method of "compensation" of these low signal to noise regions is necessary to permit the development of an accurate phase spectrum for the seismic wavelet. Such a procedure of compensating the amplitude spectrum by estimating the amplitude of the seismic wavelet at low and high frequencies is typically known as "amortization" of the amplitude spectrum.

Amortization of the amplitude spectrum of the seismic wavelet commences at 130 by the selection of $f_{L\text{-}cut}$. $f_{L\text{-}cut}$ is determined by the characteristics of a low cut filter which is included as part of a typical field recording system being used to record the seismic data. The low-cut filter is utilized in field recording systems to eliminate low frequency ground-roll noise. A low amplitude spectrum frequency $f_{L\text{-}am}$ at which to commence the low-end amortization process is then selected at step 132. While the frequency at which low-end amortization should commence may vary, amortization often becomes necessary at frequencies below 20 Hz. The low-end amortization of the seismic wavelet amplitude spectrum is then performed at 134 by the extrapolation of the amplitude spectrum according to the characteristics of the low-cut filter for frequencies below $f_{L\text{-}am}$.

Figure 4B:
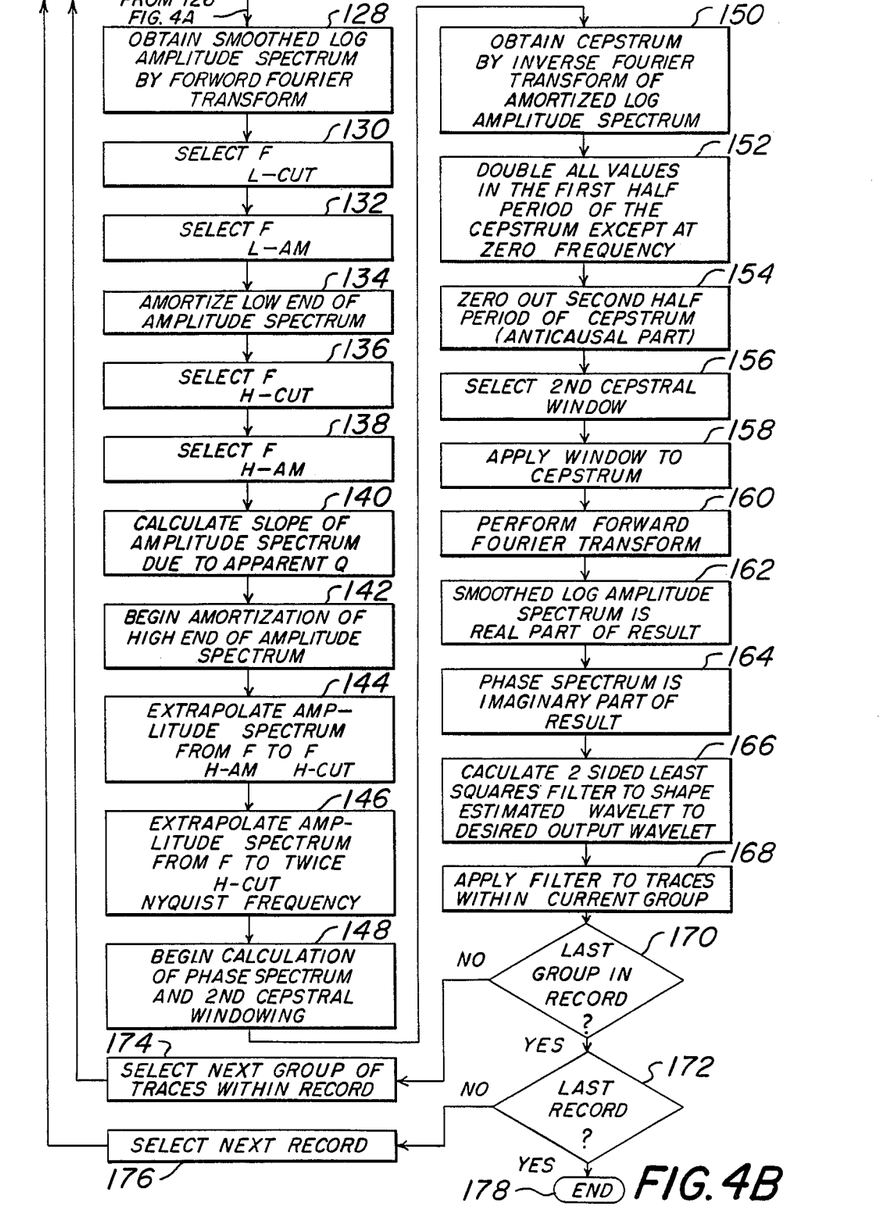
Figure 5A:
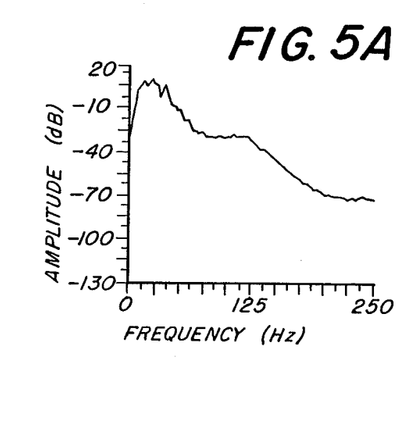
FIG. 5a illustrates the stacked and averaged amplitude spectrum of seismic traces.
Figure 5B:
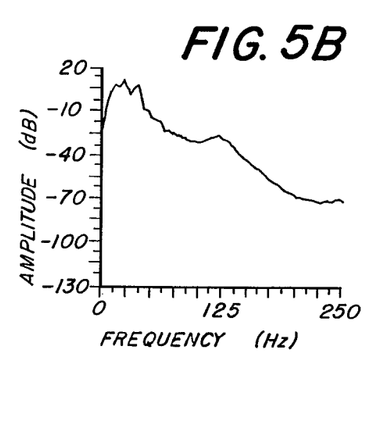
FIG. 5b illustrates the amplitude spectrum of FIG. 5a after a first cepstral windowing.
Figure 5C:
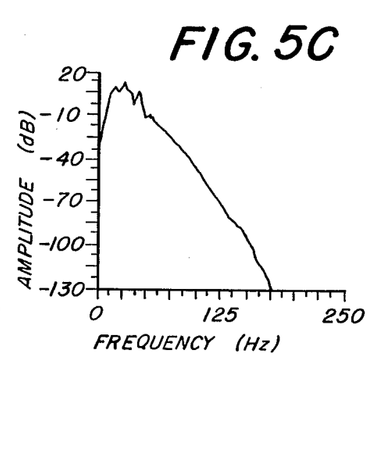
FIG. 5c illustrates the amplitude spectrum after amortization and second cepstral windowing of the seismic wavelet.

High-end amortization of the amplitude spectrum of the seismic wavelet commences at 136 by the selection of $f_{H\text{-}cut}$. $f_{H\text{-}cut}$ is determined by the characteristics of a high-cut filter which is included as part of a typical field recording system. The high-cut filter is utilized in field recording systems to prevent aliasing when the data is sampled. A second high frequency $f_{H\text{-}am}$ is them selected at 138 as the frequency at which to commence high-end amortization. While the particular $f_{H\text{-}am}$ selected for beginning high end amortization may vary, we have found that high end amortization is necessary when the random noise begins to dominate the spectrum. Such effect may become marked and therefore require amortization between 60 and 125 Hz. Once $f_{H\text{-}cut}$ and $f_{H\text{-}am}$ have been selected, the slope of the amplitude spectrum within that seismic band due to the residual apparent Q, the quality factor characterizing the earth filter is determined at 140. Such a calculation may be performed utilizing numerous methods. Speaking in the most general terms, a slope for the amplitude spectrum in the seismic band is selected which will correspond to a value of Q.

Once the slope of the amplitude spectrum of the seismic wavelet for frequencies past $f_{H\text{-}AM}$ has been determined, amortization of the high end of the amplitude spectrum commences at 142 with the slope of the seismic band due to the apparent Q being used to extrapolate at 144 the amplitude spectrum from $f_{H\text{-}am}$ to $f_{Hcut}$. At step 146, the amplitude spectrum of the seismic wavelet is extrapolated from $f_{H\text{-}cut}$ to the twice-Nyquist frequency by applying the slope of the high cut filter plus the slope due to apparent Q to the amplitude spectrum between those two points. A twice-Nyquist frequency is selected as the upper limit of the estimated amplitude spectrum necessary to produce satisfactory results in the aforementioned goal of approximating the analog case for the amplitude spectrum.

Having successfully approximated the amplitude spectrum of the analog seismic wavelet, the invention will now proceed to utilize the amortized amplitude spectrum to complete the estimation of the seismic wavelet by calculating its phase. Calculation of the phase spectrum commences at step 148 with a second cepstral windowing of the amortized amplitude spectrum. Such method of cepstral windowing is the same as the previously performed cepstral windowing process. Therefore, the amplitude spectrum is transformed from the frequency domain to the quefrency domain at step 150 by the inverse Fourier transform of the amortized log amplitude spectrum. Such transformation may be represented by the relationship.

$$a(t) = \mathcal{F}^{-1}[\log |A(f)|]. \quad (24)$$

In such a manner, the cepstrum of the amplitude spectrum is obtained. All values in the first half period of the cepstrum except for the zero frequency are then doubled at 152. At 154, the second half period of the cepstrum (known as the anticausal part) is zeroed out. A second cepstral window length is then selected at 156. Again, the selected cepstral window length will vary depending on the characteristics of the particular function being windowed. The quefrency domain cepstrum is then windowed at 158 using the selected cepstral window length, followed by transformation of the windowed quefrency domain cepstrum back to the frequency domain at 160 by use of a forward Fourier transformation. The forward Fourier transform of the windowed quefrency domain cepstrum will yield both a real and imaginary part. The real part of the forward Fourier transform of the windowed quefrency domain cepstrum is shown at 162 to be the smoothed log amplitude spectrum. The imaginary part of the forward Fourier transform of the windowed quefrency domain cepstrum is shown at 164 to be the phase spectrum.

The phase spectrum calculated in step 164 is next used to prepare at 166 a two-sided, least square filter to shape the estimated wavelet into a zero-phase low side-lobe output wavelet. Such methods of shaping the output wavelet once the amplitude and phase spectrum have been calculated are well known in the art. Proceeding to step 168, the two-sided, least square filter calculated at step 166 is applied to the seismic traces within the current group to shape the seismic wavelet to a zero-phase low side lobe output wavelet.

Proceeding to step 170, if the last group of compensated seismic traces in the record has not been processed, the next group of compensated seismic traces with the record are selected at step 174 and processing continues at step 106. If the last group of compensated seismic traces of the record have been processed at step 170, a determination is then made at step 172 whether the last record of groups of compensated seismic traces for which processing is desired have been processed. If the last records has not been processed, the processing continues at step 104. If the last record has been processed, processing ends at step 178.

Figure 6:
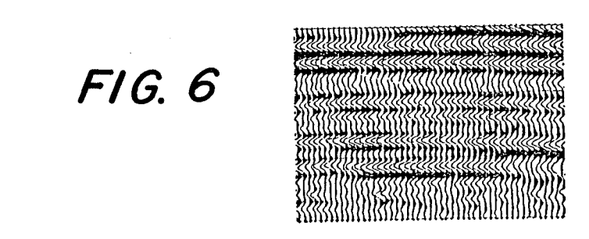
FIG. 6 illustrates a series of seismic traces similar to the seismic trace illustrated in FIG. 2 after compensation according to the method of FIG. 3 and interpreted according to the method of FIG. 4.

Turning next to FIG. 6, a series of seismic traces similar to the seismic traces illustrated in FIG. 2 are shown after compensation according to the method of FIG. 3 and interpreted according to the method of FIG. 4. The seismic traces of FIG. 6 may be compared favorably with the same data processed using conventional Weiner-Levinson or spike deconvolution. For example, seismic data processed according to the methods of the present invention would result in better resolution and more continuity of the seismic traces when compared with the same seismic data processed using spike deconvolution.

Thus, there has been described and illustrated herein a method for processing geophysical data to accurately estimate the earth filter and to compensate received seismic energy for the effects of the earth filter. There has been further described and illustrated herein a method for processing geophysical data compensated for effects of the earth filter to accurately estimate the seismic wavelet for a geophysical formation. However, those skilled in the art will recognize that many modifications and variations besides those specifically mentioned may be made in the techniques described herein without departing substantially from the concept of the present invention. Accordingly, it should be clearly understood that the form of the invention described herein is exemplary only, and is not intended as a limitation on the scope of the present invention.

What is claimed is:

1. A method of compensating for the effects of intrinsic and apparent attenuation of a seismic signal transmitted through a geophysical formation comprising the steps of:
   determining an antisymmetric component of the cepstrum of an inverse earth filter;
   determining a symmetric component of the cepstrum of said inverse earth filter modified to effect gain limiting;
   combining said modified symmetric component and said antisymmetric compenasted to determine said inverse earth filter of said geophysical formation; and
   applying said inverse earth filter to said seismic signal to determine a compensated seismic signal.

2. The method of claim 1 wherein the step of determining said modified symmetric component of the cepstrum of the inverse earth filter further comprises the steps of:
   determining a real component of the logarithm of the frequency domain inverse earth filter;
   modifying said real component to stabilize the inverse earth filter; and
   taking the inverse Fourier transform of said modified real component to determine said modified symmetric component.

3. The method of claim 1 wherein the step of determining said antisymmetric component of said cepstrum of the inverse earth filter further comprises the steps of:
   determining an imaginary component of the logarithm of the frequency domain inverse earth filter; and
   taking the inverse Fourier transform of said imaginary component to determine said antisymmetric component.

4. The method of claim 1 further comprising the step of deconvolving said compensated seismic signal.

5. The method of claim 4 wherein the step of deconvolving said compensated seismic signal further comprises the step of deconvolving said compensated seismic signal according to spiking deconvolution methods.

6. The method of claim 4 wherein the step of deconvolving said compensated seismic signal further comprises the step of deconvolving said compensated seismic signal according to flatiron deconvolution methods.

7. The method of claim 4 further comprising the steps of:
   whitening the effective reflectivity of the amplitude spectrum of said compensated seismic signal;
   reducing the effects of reflectivity leakage on said amplitude spectrum of said compensated seismic signal;
   smoothing said amplitude spectrum of said compensated seismic signal to eliminate rapidly varying components of said amplitude spectrum; and
   compensating said amplitude spectrum of said compensated seismic signal to approximate that of an analog seismic wavelet.

8. The method according to claim 4 further comprising the steps of:
   whitening effective reflectivity of said amplitude spectrum of said seismic signal;
   reducing the effects of reflectivity leakage on said amplitude spectrum of said seismic signal, said step of reducing the effects of reflectivity leakage further including the steps of transforming said amplitude spectrum from the frequency domain into the quefrency domain, selecting a first cepstral window length, applying said first cepstral window to said quefrency domain amplitude spectrum, and transforming said amplitude spectrum from said quefrency domain to said frequency domain;
   compensating said amplitude spectrum of said seismic signal to approximate that of an analog seismic wavelet; and
   smoothing said compensated amplitude spectrum to eliminate rapidly varying components, said step of smoothing said compensated amplitude spectrum further including the steps of transforming said amplitude spectrum from the frequency domain into the quefrency domain, selecting a second cepstral window length, applying said second cepstral window to said quefrency domain amplitude spectrum, and transforming said amplitude spectrum from said quefrency domain to said time domain.

9. The method according to claim 1 wherein the step of applying said inverse earth filter to said seismic signal to determine said compensated seismic signal further comprises the steps of:
   repeatedly applying said combination to said seismic signal to produce a series of traces; and
   summing said series of traces produced by said repeated applications and said seismic signal to determine said compensated signal.

10. The method according to claim 9 wherein the step of repeatedly applying said combination to said seismic signal to produce a series of traces further comprises the step of convolving the Taylor series expansion of said combination with said seismic signal.

11. A method of compensating for the effects of intrinsic and apparent attenuation of a series of seismic signals transmitted through a geophysical formation comprising the steps of:
   selecting a first seismic signal;
   determining an antisymmetric component of the cepstrum of the inverse earth filter;
   determining a symmetric component of the cepstrum of the inverse earth filter modified to effect gain limiting;
   combining said symmetric and antisymmetric components;
   repeatedly applying said combination to said first seismic signal;
   combining partial results produced by said repeated applications to determine a first compensated seismic signal;
   selecting a next seismic signal; and repeating said selecting, applying, and combining steps until all seismic signals have been compensated.

12. The method of claim 11 wherein the step of determining said modified symmetric component of the cepstrum of the inverse earth filter further comprises the steps of:
   determining a real component of the logarithm of the frequency domain inverse earth filter;
   modifying said real component to stabilize the inverse earth filter; and
   taking the inverse Fourier transform of said modified real component to determine said modified symmetric component.

13. The method of claim 11 wherein the step of determining said antisymmetric component of said inverse earth filter further comprises the steps of:
   determining an imaginary component of the logarithm of the frequency domain inverse earth filter; and
   taking the inverse Fourier transform of said imaginary component to determine said antisymmetric component.

14. The method of claim 11 further comprising the step of deconvolving said compensated seismic signal.

15. The method of claim 11 wherein the step of deconvolving said compensated seismic signal further comprises the step of deconvolving said compensated seismic signal according to spiking deconvolution methods.

16. The method of claim 11 wherein the step of deconvolving said compensated seismic signal further comprises the step of deconvolving said compensated seismic signal according to flatiron deconvolution methods.

17. The method of claim 11 further comprising the steps of:
   whitening the effective reflectivity of the amplitude spectrum of said compensated seismic signal;
   reducing the effects of reflectivity leakage on said amplitude spectrum of said compensated seismic signal;
   smoothing said amplitude spectrum of said compensated seismic signal to eliminate rapidly varying components of said amplitude spectrum; and
   compensating said amplitude spectrum of said compensated seismic signal to approximate that of an analog seismic wavelet.

18. The method according to claim 11 wherein the step of repeatedly applying said combination to said first seismic signal further comprises the step of convolving the Taylor series expansion of said combination with said seismic signal.

19. The method according to claim 11 further comprising the steps of:
   whitening effective reflectivity of said amplitude spectrum of said seismic signal;
   reducing the effects of reflectivity leakage on said amplitude spectrum of said seismic signal, said step of reducing the effects of reflectivity leakage further including the steps of transforming said amplitude spectrum from the frequency domain into the quefrency domain, selecting a first cepstral window length, applying said first cepstral window to said quefrency domain amplitude spectrum, and transforming said amplitude spectrum from said quefrency domain to said frequency domain;
   compensating said amplitude spectrum of said seismic signal to approximate that of an analog seismic wavelet; and
   smoothing said compensated amplitude spectrum to eliminate rapidly varying components, said step of smoothing said compensated amplitude spectrum further including the steps of transforming said amplitude spectrum from the frequency domain into the quefrency domain, selecting a second cepstral window length, applying said second cepstral window to said quefrency domain amplitude spectrum, and transforming said amplitude spectrum from said quefrency domain to said time domain.

20. A method of compensating the amplitude spectrum of a seismic trace for the effects of earth filtering, nonwhite reflectivity of the subsurface formation being explored and sampling, comprising:
   determining an antisymmetric component of the cepstrum of an inverse earth filter;
   determining a symmetric component of the cepstrum of said inverse earth filter modified to effect gain limiting;
   combining said modified symmetric component and said antisymmetric component to determine said inverse earth filter of said geophysical formation;
   applying said inverse earth filter to said seismic signal to determine a compensated seismic signal;
   whitening effective reflectivity of the amplitude spectrum of said compensated seismic signal;
   reducing the effects of reflectivity leakage on said amplitude spectrum of said compensated seismic signal;
   compensating said amplitude spectrum of said seismic signal to approximate that of an analog seismic wavelet; and
   smoothing said compensated amplitude spectrum of said compensated seismic signal to eliminate rapidly varying components of said compensated amplitude spectrum.

21. The method of claim 20 wherein the step of whitening the effective reflectivity of said amplitude spectrum of said seismic trace further comprises the steps of:
   selecting a first seismic trace;
   determining an autocorrelation function for said first seismic trace;
   determining an amplitude spectrum for said first seismic trace from said autocorrelation function;
   stacking said amplitude spectrum onto said stack;
   selecting a next seismic trace;
   repeating the steps of determining the autocorrelation function, determining the amplitude spectrum, and stacking said amplitude spectrum for said next seismic trace until all seismic traces have been stacked; and
   averaging said stacked amplitude spectrum to yield an average amplitude spectrum.

22. The method of claim 20 wherein the step of compensating said amplitude spectrum to approximate an analog seismic wavelet further comprises the steps of:
   amortizing low frequencies of said amplitude spectrum to remove the effect of low frequency noise such as ground roll from the estimated of the wavelet amplitude spectrum; and
   amortizing high frequencies of said amplitude spectrum to remove the effect of high frequency noise from the estimate of the wavelet amplitude spectrum.

23. The method of claim 22 wherein the step of amortizing low frequencies of said amplitude spectrum to eliminate low frequency ground roll noise further comprises the steps of:

selecting a low frequency value at which to commence low end amortization; and applying the slope of the low cut filter to the portion of said amplitude spectrum having a frequency less than said low frequency value.

24. The method of claim 22 wherein the step of amortizing high frequencies of said amplitude spectrum to remove the effect of high frequency noise from the estimate of the wavelet amplitude spectrum further comprises the steps of:

selecting a first and second high frequency value to commence high end amortization;

applying said characteristics of the earth filter to the portion of the ampltidue spectrum between said first and said second high frequency values; and applying the slope of the high cut filter and the slope of the earth filter to the portion of said amplitude spectrum between said second high frequency value and an upper limit frequency.

25. The method according to claim 20 wherein the step of reducing the effects of reflectivity leakage on said amplitude spectrum of said compensated seismic signal further comprises the steps of transforming said amplitude spectrum from the frequency domain into the quefrency domain, selecting a first cepstral window length, applying said first cepstral window to said quefrency domain amplitude spectrum, and transforming said amplitude spectrum from said quefrency domain to said frequency domain.

26. The method according to claim 25 where in the step of smoothing said compensated amplitude spectrum of said compensated seismic signal to eliminate rapidly varying components of said compensated amplitude spectrum further comprises the steps of transforming said amplitude spectrum from the frequency domain into the quefrency domain, selecting a second cepstral window length, applying said second cepstral window to said quefrency domain amplitude spectrum, and transforming said amplitude spectrum from said quefrency domain to said time domain.

27. A method of processing geophysical data to make it more useful in interpreting the subsurface characteristics of the earth comprising:

acquiring at least one seismic trace containing information related to the subsurface characteristics of the earth;

determining an antisymmetric component of the cepstrum of an inverse earth filter;

determining a symmetric component of the cepstrum of said inverse earth filter;

combining said modified symmetric component and said antisymmetric component to determine said inverse earth filter of said geophysical formation;

applying said inverse earth filter to said at least one seismic trace to determine at least one compensated seismic trace;

determining an amplitude spectrum for said at least one compensated trace;

whitening effective reflectivity of each of said at least one compensated seismic trace;

compensating said amplitude spectrum of said at least one seismic trace to approximate an analog seismic wavelet;

estimating a phase spectrum for said seismic wavelet from said compensated seismic wavelet;

determining a two sided, least squares filter from said estimated phase spectrum; and determining an output seismic wavelet from said compensated amplitude spectrum and said estimated phase spectrum by applying said two sided, least squares filter to said compensated amplitude spectrum in the time domain wherein said seismic wavelet is shaped into a zerophase, low sidelobe output wavelet by said two sided, least squares filter.

28. The method of claim 27 further comprising the steps of:

determining the autocorrelation function for each of said at least one seismic trace;

determining an amplitude spectrum for each of said at least one seismic trace from said autocorrelation function;

stacking said amplitude spectrums for said at least one seismic trace; and determining an average amplitude spectrum for said at least one seismic trace from said stacked amplitude spectrum.

29. The method of claim 27 wherein the step of compensating said amplitude spectrum of said at least one seismic trace to approximate an analog seismic wavelet further comprises:

amortizing low frequencies of said amplitude spectrum to remove the effect of low frequency noise such as ground roll from the estimate of the wavelet amplitude spectrums; and amortizing high frequencies of said amplitude spectrum to remove the effect of high frequency noise from the estimate of the wavelet amplitude spectrum.

30. The method of claim 29 wherein the step of amortizing said low frequencies of said amplitude spectrum to remove the effect of low frequency noise such as ground roll further comprises the steps of:

selecting a low frequency value at which to commence low end amortization; and applying the slope of the low cut filter to the portion of said amplitude spectrum having a frequency less than said low frequency value.

31. The method of claim 29 wherein the step of amortizing the high frequencies of said amplitude spectrum remove the effect of high frequency noise from the estimate of the wavelet amplitude spectrum further comprises the steps of:

selecting a first and second high frequency value to commence high end amortization;

applying said characteristics of the earth filter to the portion of the amplitude spectrum between said first and said second high frequency values; and applying the slope of the high cut filter and the slope of the earth filter to the portion of said amplitude spectrum between said second high frequency value and an upper limit frequency.

32. The method of claim 27 further comprising the step of selecting a portion of said at least one compensated seismic trace for interpretation.

33. The method of claim 27 wherein the step of compensating said amplitude spectrum to approximate an analog wavelet further comprises the step of reducing the effects of reflectivity leakage on said amplitude spectrum.

34. The method of claim 33 wherein the step of reducing the effects of reflectivity leakage on said amplitude spectrum further comprises the steps of:

transforming said amplitude spectrum from the frequency domain into the quefrency domain;
    selecting a first cepstral window length;
    applying said first cepstral window to said quefrency domain amplitude spectrum; and
    transforming said amplitude spectrums from said quefrency domain to said time domain.

35. The method of claim 33 further comprising the step of smoothing said amplitude spectrum to eliminate rapidly varying components of said amplitude spectrum.

36. The method of claim 35 wherein the step of smoothing said amplitude spectrum to eliminate rapidly varying components of said amplitude spectrum further comprises the steps of     transforming said amplitude spectrums from the frequency domain into the quefrency domain;
    doubling all valves in the first half period of said transformed amplitude spectrum greater than zero;
    eliminating all valves in the second half period of said transformed amplitude spectrum;
    selecting a second cepstral window length;
    applying said second cepstral window to said transformed amplitude spectrum; and
    transforming said amplitude spectrum from said quefrency domain to said time domain.

37. The method of claim 35 wherein the step of smoothing said amplitude spectrum to eliminate rapidly varying components of said amplitude spectrum further comprises the steps of:

transforming said amplitude spectrum from the frequency domain into the quefrency domain;
    selecting a second cepstral window length;
    applying said second cepstral window to said quefrency domain amplitude spectrum; and
    transforming said amplitude spectrum from said quefrency domain to said time domain.

* * * * *

UNITED STATES PATENT AND TRADEMARK OFFICE
CERTIFICATE OF CORRECTION

PATENT NO. : 4,884,247            Page 1 of 2

DATED : November 28, 1989

INVENTOR(S) : Mohamed T. Hadidi, Andrejs Jurkevics, Andrew F. Linville, Jr.

It is certified that error appears in the above-identified patent and that said Letters Patent is hereby corrected as shown below:

Col. 3, line 60, In the portion of the equation that reads "$f_o$", the "o" should clearly be a subscript.

Col. 4, line 4, In the portion of the equation that reads "$f_o$", the "o" should clearly be a subscript.

Col. 5, line 65, Missing text and equations, as follows:

-- and where equation (7) may be simplified to yield:

$$\hat{H}(f) = \frac{\tau}{Q} H(f) \tag{8a}$$

where:

$$H(f) = \pi |f| + i2f \ln |f_o/f|. \tag{8b}$$

Col. 6, line 29, In the equation, the portion that reads "HGL(f)" should read -- $H_{GL}(f)$ --.

Col. 6, lines 35-36, Delete "Where
                 GL    = gain limited; and"

Col. 7, line 64, "(17)" should be at the end of the line, and "and:" should be at the beginning of the next line, by itself.

Col. 7, line 67, Delete "tm" at the end of equation (19).

Col. 7, line 67, "(19)" should be at the end of the line.

UNITED STATES PATENT AND TRADEMARK OFFICE
CERTIFICATE OF CORRECTION

PATENT NO. : 4,884,247

DATED : November 28, 1989

INVENTOR(S) : Mohamed T. Hadidi, Andrejs Jurkevics, Andrew F. Linville, Jr.

It is certified that error appears in the above-identified patent and that said Letters Patent is hereby corrected as shown below:

Col. 11, line 34, "them" should be -- then --.

Col. 11, line 51, "$f_{H-AM}$" should be -- $f_{H-aM}$ --.

Col. 12, line 48, "with" should be -- within --.

Col. 12, line 54, "records" should be -- record --.

Col. 13, line 29, "compenasted" should be -- component --.

Col. 16, line 63, "estimated" should be -- estimate --.

Col. 18, line 63, "trace" should be -- spectrum --.

Col. 19, line 20, "spectrums" should be -- spectrum --.

Signed and Sealed this

Eighteenth Day of June, 1991

Attest:

HARRY F. MANBECK, JR.

Attesting Officer

Commissioner of Patents and Trademarks